(12) United States Patent
Zhou et al.

(10) Patent No.: US 10,266,297 B2
(45) Date of Patent: Apr. 23, 2019

(54) LABELING DEVICE

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventors: Yuhua Zhou, Beijing (CN); Ting Wang, Beijing (CN); Chunlei Cao, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 15/527,211

(22) PCT Filed: Jul. 29, 2016

(86) PCT No.: PCT/CN2016/092374
§ 371 (c)(1),
(2) Date: May 16, 2017

(87) PCT Pub. No.: WO2017/071345
PCT Pub. Date: May 4, 2017

(65) Prior Publication Data
US 2017/0355481 A1    Dec. 14, 2017

(30) Foreign Application Priority Data
Oct. 26, 2015    (CN) .......................... 2015 1 0701954

(51) Int. Cl.
*B29C 65/00* (2006.01)
*B65C 9/18* (2006.01)
(Continued)

(52) U.S. Cl.
CPC .................. *B65C 9/18* (2013.01); *B65C 9/06* (2013.01); *B65C 9/1865* (2013.01); *B65C 9/42* (2013.01);
(Continued)

(58) Field of Classification Search
CPC . B32B 38/10; B32B 43/006; Y10T 156/1168; Y10T 156/1195; Y10T 156/171;
(Continued)

(56) References Cited

U.S. PATENT DOCUMENTS

2002/0096264 A1    7/2002    Yang
2006/0289106 A1    12/2006    Thiel et al.
(Continued)

FOREIGN PATENT DOCUMENTS

CN    2501816 Y    7/2002
CN    103662236 A    3/2014
(Continued)

OTHER PUBLICATIONS

International Search Report and Written Opinion dated Oct. 31, 2016; PCT/CN2016/092374.
(Continued)

*Primary Examiner* — Mark A Osele
*Assistant Examiner* — Nickolas R Harm
(74) *Attorney, Agent, or Firm* — Ladas & Parry LLP

(57) ABSTRACT

A labeling device, comprising a scale control assembly (11) and a stripping assembly (12), the scale control assembly (11) being configured to obtain a material strip (10) and to lead out a predetermined length of the material strip (10); the stripping assembly (12) being configured to grasp a target label (101) on the material strip (10) led out by the scale control assembly (11) and to affix the target label (101) to a product (D) to be labeled at a pre-set position so as to obtain a labeled product. Said device controls, by means of the
(Continued)

scale control assembly, the length of the material strip that is led out at each time when labeling the product to be labeled, so as to improve the precision of the stripping assembly grasping the label and affixing the label to the product to be labeled.

11 Claims, 5 Drawing Sheets

(51) Int. Cl.
*B65C 9/06* (2006.01)
*B65C 9/42* (2006.01)
*B29C 65/78* (2006.01)
*B32B 38/10* (2006.01)
*B32B 43/00* (2006.01)

(52) U.S. Cl.
CPC ...... *B29C 65/7802* (2013.01); *B29C 65/7841* (2013.01); *B29C 65/7864* (2013.01); *B32B 38/10* (2013.01); *B32B 43/006* (2013.01); *Y10T 156/1168* (2015.01); *Y10T 156/1195* (2015.01); *Y10T 156/171* (2015.01); *Y10T 156/1768* (2015.01); *Y10T 156/1994* (2015.01)

(58) Field of Classification Search
CPC ......... Y10T 156/1768; Y10T 156/1994; B29C 65/7802; B29C 65/7841; B29C 65/7864; B29C 65/80
USPC ....... 156/247, 249, 350, 358, 361, 364, 368, 156/379, 542, 719, 764, 767
See application file for complete search history.

(56) References Cited

U.S. PATENT DOCUMENTS

2009/0314413 A1 12/2009 Brandow et al.
2014/0338839 A1 11/2014 Yu et al.
2015/0274346 A1 10/2015 Buckby et al.

FOREIGN PATENT DOCUMENTS

| CN | 104163275 A | 11/2014 |
| CN | 203997149 U | 12/2014 |
| CN | 104512585 A | 4/2015 |
| CN | 104528088 A | 4/2015 |
| CN | 104903200 A | 9/2015 |
| CN | 105366141 A | 3/2016 |
| EP | 2474584 A1 | 7/2012 |
| EP | 2481675 A2 | 8/2012 |

OTHER PUBLICATIONS

The First Chinese Office Action dated Mar. 24, 2017; Appln. No. 201510701954.X.
The second Chinese Office Action dated Oct. 24, 2017; Appln. 201510701954.X.

LABELING DEVICE

TECHNICAL FIELD

Embodiments of the present disclosure relate to a labeling device.

BACKGROUND

A labeling device is used for attaching labels to a variety of products, and may be a labeling pressing fixture, a semi-automatic labeling device, an automatic labeling device, and so on.

In display device industry, usually, the labeling pressing fixture is utilized to attach labels to a product because various labels are different in lengths, sizes and types. An operator may firstly grab a label and then attach the label onto the product by using the labeling pressing fixture.

However, using a known labeling pressing fixture to attach the label onto the product in the above-described method involves a defect of lower precision.

SUMMARY

In order to solve the problem that using a known labeling pressing fixture to attach the label onto the product results in lower precision, embodiments of the present invention provide technical solutions as below.

According to one aspect, embodiments of the present invention provide a labeling device, including a scale control component and a stripping component; wherein the scale control component is configured to acquire a tape, and to export the tape at a predetermined length; the stripping component is configured to grab a target label on the tape exported from the scale control component and to attach the target label onto a product to be labeled which is located at a preset position, so as to obtain a labeled product.

In one example, the tape is provided with a plurality of equally spaced labels, and a length L of the tape exported from the scale control component satisfies $H+K \leq L \leq H+2K$, where K is a space between the labels, and H is a length of the label.

In one example, the labeling device further includes a feeding component and a receiving component, wherein the feeding component is configured to initially store the tape; and the receiving component is configured to pull out and receive the tape exported from the feeding component, wherein the scale control component, the stripping component, the feeding component and the receiving component are arranged such that: the tape exported from the feeding component as driven by the receiving component is received by the receiving component only upon running through the scale control component and through the stripping component.

In one example, the feeding component is a wheel, and the receiving component is a motor-driven wheel.

In one example, the scale control component includes a fixing member, a moving member and a label sensor, and the labeling device further includes a scale control module electrically connected with the scale control component, wherein the moving member is movably connected with the fixing member; the moving member is configured to clamp the tape, and configured to move on the fixing member as driven by the tape; the label sensor is configured to sense a spacing region between the labels on the tape; the scale control module is configured to, upon the label sensor sensing the spacing region ahead of the target label on the tape, control the moving member to clamp the tape and to move from an initial position for a preset distance as driven by the tape and then stop, so as to limit a movement of the tape; and the scale control module is further configured to, upon the stripping component attaching the target label onto to the product to be labeled, control the moving member to return to the initial position, wherein the preset distance is equal to the length L of the tape exported from the scale control component; the spacing region is a region between adjacent labels on the tape; and the spacing region ahead of the target label is one of the spacing regions on both ends of the target label, which is more forward along a moving direction.

In one example, the stripping component includes an attaching cylinder and a moving cylinder, and the labeling device further includes a stripping control module electrically connected with the stripping component, wherein the attaching cylinder is provided with a stripping attaching rod, the stripping attaching rod is configured to move along a length direction of the stripping attaching rod, and is configured to strip the target label off the tape and attach the target label onto the product to be labeled; the moving cylinder is provided with a stripping platform, the stripping platform is configured to move between a stripping position and a standby position as driven by the moving cylinder; and the stripping control module is configured to, upon the stripping platform being in the stripping position and the target label having moved with the tape to the stripping platform, control the stripping attaching rod to grab the target label; and the stripping control module is further configured to, upon the stripping attaching rod grabbing the target label, control the stripping platform to move to the standby position and control the stripping attaching rod to stretch out, so as to attach the target label onto the product to be labeled.

In one example, the labeling device further includes a compression component, the compression component includes a compression cylinder and a compression platform, and the compression component is configured to acquire the tape exported from the scale control component and guide the tape to the stripping component, wherein the compression cylinder is provided with a compression rod, and the compression rod is configured to tightly press the tape which has moved to the compression platform, as driven by the compression cylinder.

In one example, the compression platform is further provided with a flattening plate, the flattening plate is configured to press against the tape, so that the tape moves on the compression platform in a manner of attaching to the compression platform.

In one example, the labeling device further includes a product placement component, wherein the product placement component includes a base and at least two product placement platforms connected therewith, and every product placement platform is configured to allow a product to be labeled to be placed thereon, and is configured to move the product to be labeled to the preset position, as driven by the base, in sequence.

In one example, the at least two product placement platforms are arranged in a circumferential array with a center of the base as a circle center, and the base is capable of rotating and driving the at least two product placement platforms to circumferentially move with the center of the base as the circle center.

In one example, the labeling device further includes a labeling inspection component, the labeling inspection component is configured to acquire an image of the labeled product located at an inspection position, and configured to determine whether the label on the labeled product satisfies a preset attachment precision or not according to the image; wherein every product placement platform, upon moving to the preset position as driven by the base, is capable of further moving to the inspection position as driven by the base.

In one example, the labeling inspection component includes a camera configured to acquire the image of the labeled product located at the inspection position.

In one example, the labeling inspection component further includes a magnifying glass with a light source, and the magnifying glass with the light source is disposed between the camera and the inspection position.

By using the scale control component, every time when the label is attached onto the product to be labeled, the length of the tape as exported is controlled, so as to increase the precision for the stripping component to grab the label and to attach the label onto the product to be labeled; in this way, it solves the problem that using a known labeling pressing fixture to attach the label onto the product involves lower precision, and achieves technical effect of improving the labeling precision.

BRIEF DESCRIPTION OF THE DRAWINGS

Hereafter, the embodiments of the present invention will be described in a more detailed way with reference to the accompanying drawings, so as make one person skilled in the art be able to understand the present invention more clearly, wherein.

DETAILED DESCRIPTION

Hereafter, the technical solutions in the embodiments of the present disclosure will be described in a clearly and fully understandable way in connection with the drawings in the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the disclosure.

Unless otherwise defined, the technical terminology or scientific terminology used herein should have the same meaning as commonly understood by one of ordinary skill in the art to which this invention belongs. Likewise, terms like "first," "second," etc., which are used in the description and the claims of the present application for invention, are not intended to indicate any sequence, amount or importance, but distinguish various components. The phrases "connect", "connected", etc., are not intended to define a physical connection or mechanical connection, but may include an electrical connection, directly or indirectly. "On," "under," "left," "right" or the like is only used to describe a relative positional relationship, and when the absolute position of a described object is changed, the relative positional relationship might also be changed accordingly.

Figure 1:
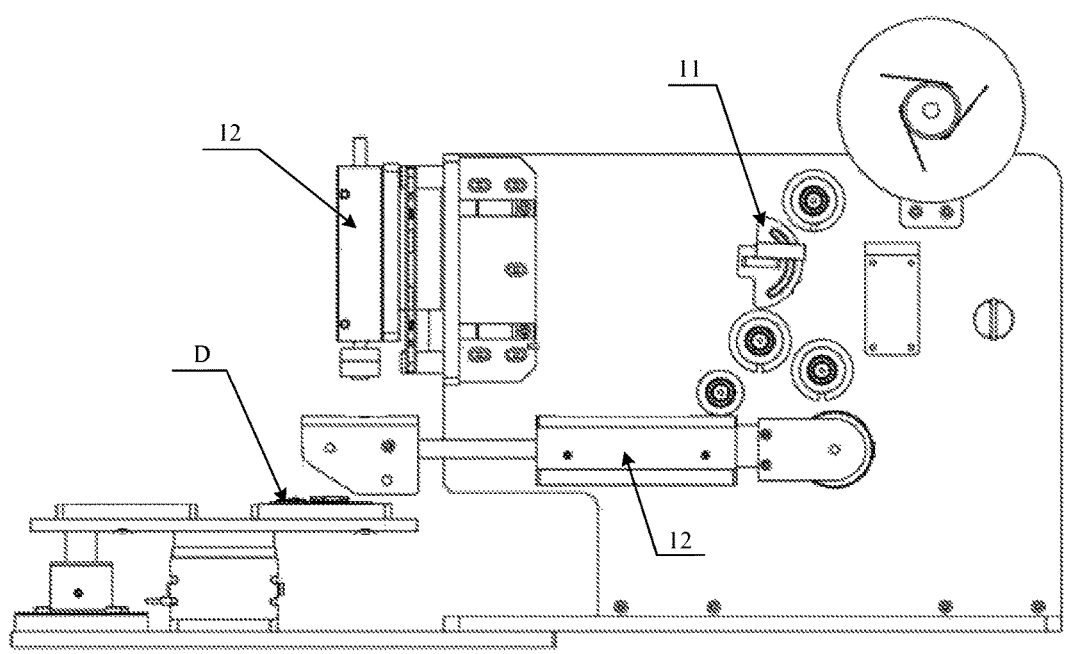
FIG. 1 is a schematic diagram illustrating a structure of a labeling device provided by an embodiment of the present disclosure.

FIG. 1 is a schematic diagram illustrating a labeling device provided by an embodiment of the present disclosure. As illustrated in FIG. 1, the labeling device may include a scale control component 11 and a stripping component 12. The scale control component 11 is configured to acquire a tape, and configured to control a length of the tape as acquired and then export the tape at a controlled length; that is, the tape with a predetermined length. The stripping component 12 is configured to grab a target label on the tape exported from the scale control component 11, and attach the target label on a product D to be labeled which is located at a preset position, so as to acquire a labeled product.

As described above, in the labeling device provided by the embodiment of the present disclosure, every time when the label is attached to the product to be labeled, the length of the tape as exported is controlled by the scale control component, so as to increase the precision for the stripping component to grab the label and to attach the label onto the product to be labeled. In this way, it solves the problem that using a known labeling pressing fixture to attach the label onto the product involves lower precision, and achieves technical effect of improving the labeling precision.

Figure 2A:
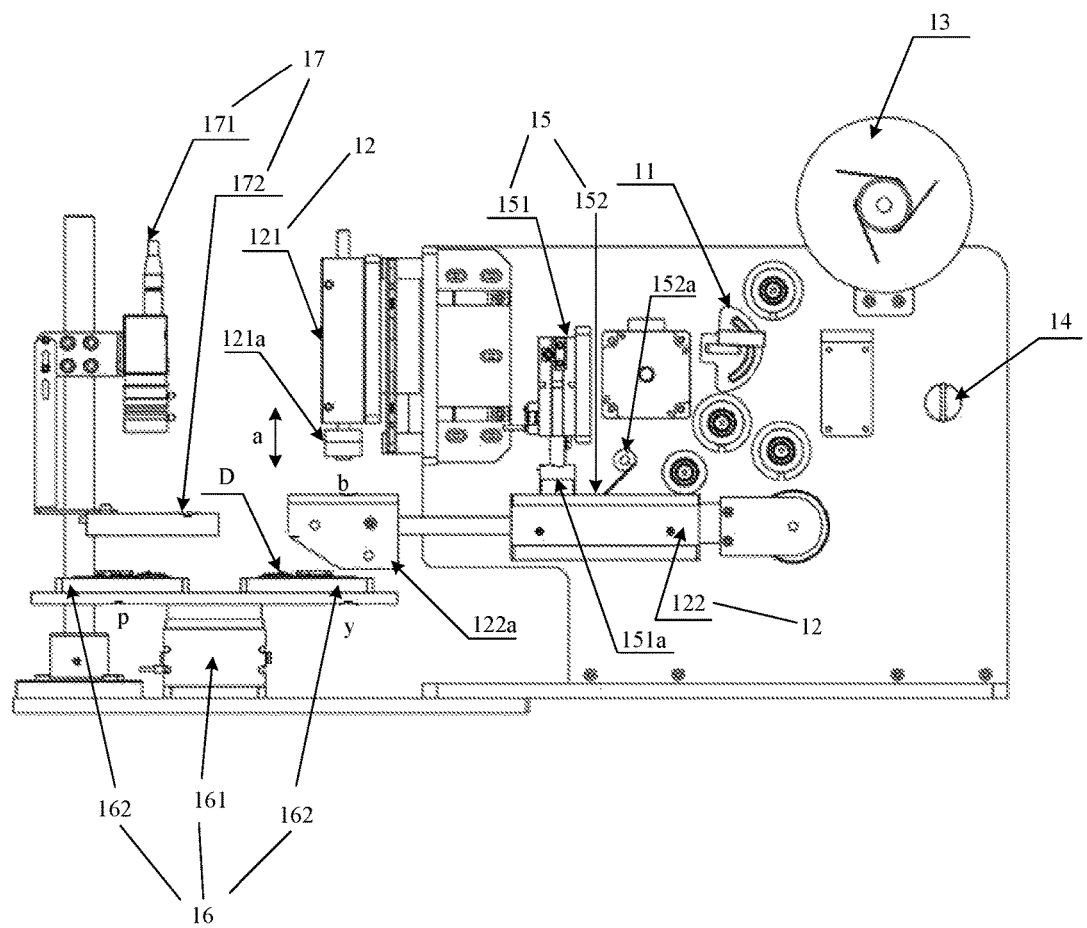
FIG. 2A is a schematic diagram illustrating another labeling device provided by an embodiment of the present disclosure.

FIG. 2A illustrates a structure of another labeling device provided by an embodiment of the present disclosure. As compared with the labeling device illustrated in FIG. 1, an additional component is included in the labeling device provide by the present embodiment to achieve better performance.

As illustrated in FIG. 2A, the labeling device may further include a feeding component 13 and a receiving component 14. The feeding component 13 is configured to initially store the tape. For example, the feeding component 13 may be implemented as a wheel, and the tape may wind round the wheel or gradually extend as the rotation of the wheel. The receiving component 14 is configured to pull out the tape from the feeding component 13 and receive the tape. For example, the receiving component 14 may be implemented as a wheel with a driver. Exemplarily, the receiving component 14 may be driven by a stepper motor.

According to the technical solution of the present embodiment, as driven by the receiving component 14, the tape is exported from the feeding component 13, passing through the scale control component 11 and the stripping component 12, and is finally received by the receiving component 14. For example, with a driven rotation of the receiving component 14 in a form of wheel, the tape that is initially wound on the feeding component 13 in a form of wheel will gradually leave the feeding component 13 under a pulling force, and finally be wound on the receiving component 14 to implement the above-described "receiving". Here, a positional relationship among the feeding component 13, the scale control component 11, the stripping component 12 and the receiving component 14 is not limited in any way, as long as the tape exported from the feeding component 13 as driven by the receiving component 14 runs through the scale control component 11 and the stripping component 12 before it's received by the receiving component 14.

Figure 2B:
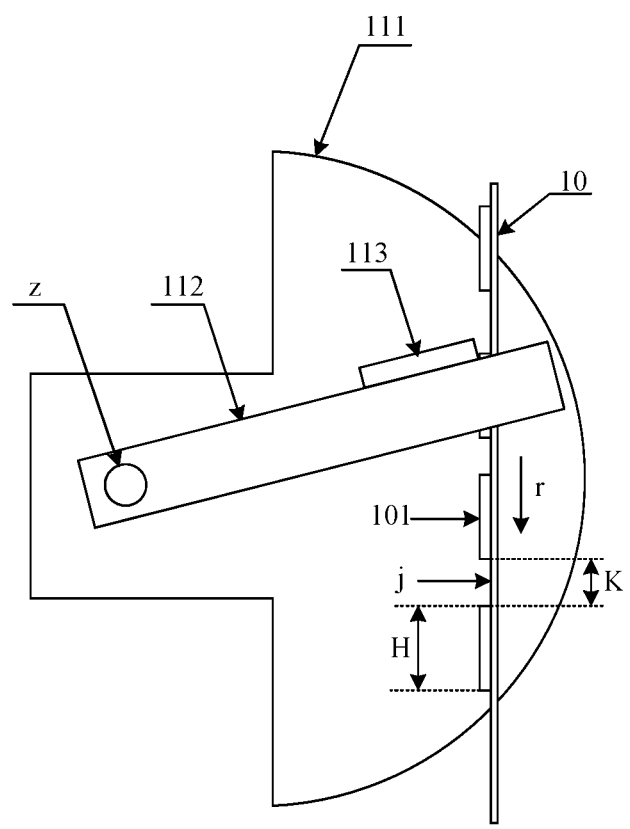
FIG. 2B is a schematic diagram illustrating a scale control component of the labeling device illustrated in FIG. 2A.

FIG. 2B is a schematic diagram illustrating a structure of the scale control component 11 of the labeling device illustrated in FIG. 2A. The scale control component 11 includes a fixing member 111, a moving member 112 and a label sensor 113, wherein the moving member 112 is movably connected with the fixing member 111. The moving member 112 is configured to clamp, for example, the tape 10 exported from the feeding component 13 as driven by the receiving component 14, and to move on the fixing member 111 as driven by the tape 10. Although FIG. 2B illustrates a case where the moving member 112 moves along a curve, taken Z as an axis, driven by the tape 10, yet the moving member 112 may also move linearly as driven by the tape 10, without particularly limited by the embodiments of the present disclosure.

In one example, the labeling device further includes a label sensor 113 and a scale control module electrically connected with the scale control component 11. The label sensor 113 is configured to sense a spacing region j between labels 101 on the tape 10; the tape 10 is provided with a plurality of equally spaced labels 101, and a region between adjacent two labels 101 is just the spacing region. Exemplarily, the label sensor 113 may sense the spacing region j by a height difference on the tape 10. The scale control module is configured to, when the label sensor 113 senses the spacing region ahead of the target label on the tape 10, control the moving member 112 to clamp the tape 10, so that the moving member 112 is driven by the tape 10 to move from an initial position by a preset distance and then stop, so as to limit the movement of the tape 10; the scale control module is further configured to, after the stripping component 12 attaches the target label onto to the product to be labeled, control the moving member 112 to return to the initial position, wherein the target label is any label on the tape 10; the preset distance is equal to a length L of the tape desired to be exported from the scale control component 11, and L satisfies: $H+K \leq L \leq H+2K$, where, K is a space between the labels 101 on the tape 10, and H is a length of the label. The spacing region ahead of the target label is one of the spacing regions on both ends of the target label, which is more forward along a moving direction.

Every time when attaching a label onto a product to be labeled by using the labeling device provided by the embodiment of the present disclosure, a series of same labeling actions need to be completed; and the scale control component 11 is arranged to ensure a length of the exported tape for labeling is consistent given that the same tape is used. In addition, the operator may further adjust the length L of the exported tape by the scale control component 11, so that the labeling device provided by the embodiment of the present disclosure can precisely attach labels on different tapes (a size of the label or a space between adjacent labels on different tapes may be different) onto the product to be labeled.

Figure 2C:
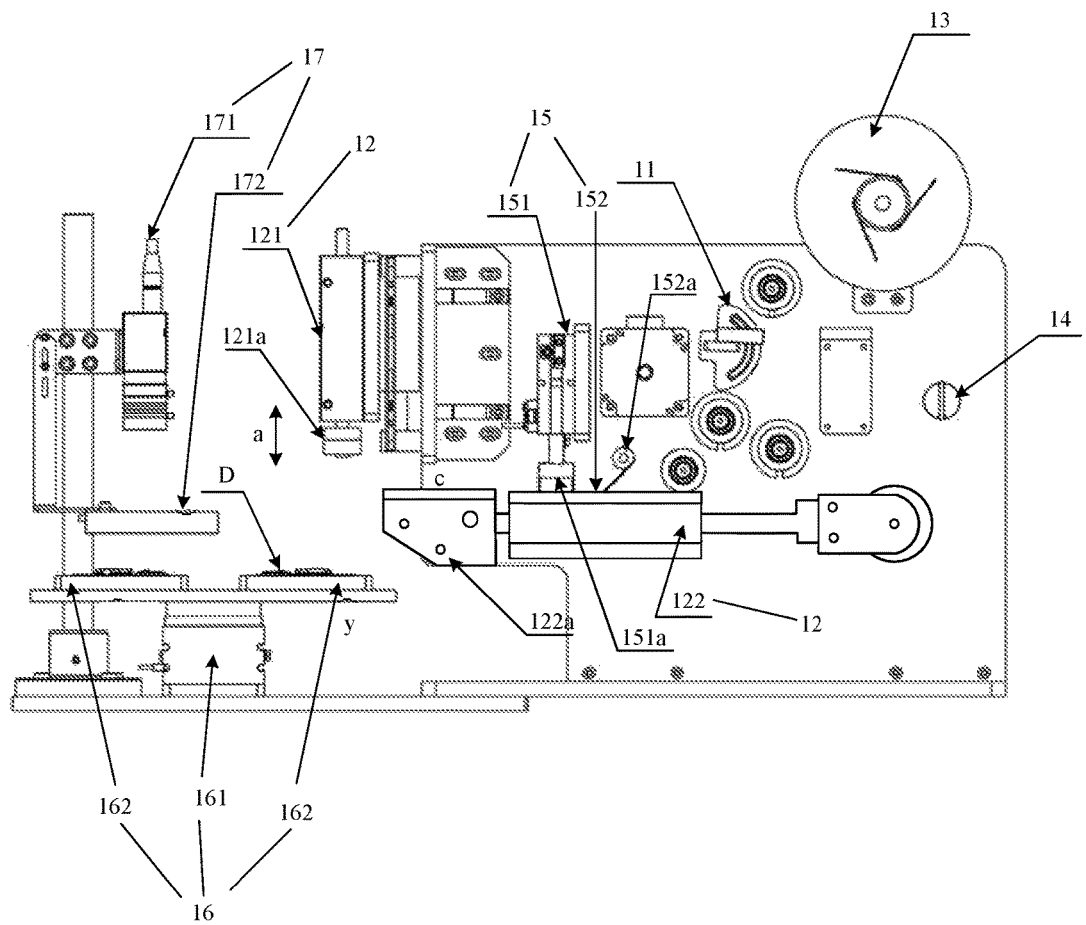
FIG. 2C is a schematic diagram illustrating a stripping platform of the labeling device illustrated in FIG. 2A, wherein the stripping platform is located at a different position.

Still, as illustrated in FIG. 2A, the stripping component 12 includes an attaching cylinder 121 and a moving cylinder 122. The attaching cylinder 121 is provided with a stripping attaching rod 121a, the stripping attaching rod 121a can move along a length direction a of the stripping attaching rod 121a, and the stripping attaching rod 121a is configured to strip a target label off the tape and attach the target label onto the product D to be labeled. The moving cylinder 122 is provided with a stripping platform 122a, and the stripping platform 122a is capable of moving between a stripping position and a standby position as driven by the moving cylinder 122. FIG. 2A illustrates the stripping platform 122a located at the stripping position b; and FIG. 2C illustrates the stripping platform 122a located at the standby position c. Other reference signs in FIG. 2C indicate the same with those in FIG. 2A.

In one example, the labeling device further includes a stripping control module electrically connected with the stripping component 12. The stripping control module is configured to, when the stripping platform 122a is in the stripping position and the target label moves with the tape to the stripping platform 122a, control the stripping attaching rod 121a to grab the target label; and the stripping control module is further configured to, after the stripping attaching rod 121a grabs the target label, control the stripping platform 122a to move to the standby position and control the stripping attaching rod 121a to stretch out so as to attach the target label onto the product to be labeled.

It should be noted that, the scale control module and the stripping control module involved in the embodiments of the present disclosure may be implemented as one or more processors for controlling operation of the labeling device provided by the embodiment of the present disclosure.

In one example, as illustrated in FIG. 2A, the labeling device further includes a compression component 15, the compression component 15 includes a compression cylinder 151 and a compression platform 152; and the compression component 15 is configured to acquire the tape exported from the scale control component 11, and guide the tape to the stripping component 12. Although the compression platform 152 illustrated in FIG. 2A is constituted by an upper portion of the moving cylinder 122, the compression platform 152 may also be provided separately, without particularly limited in the embodiments of the present disclosure. The compression cylinder 151a is provided with a compression rod 151a, and the compression rod 151a is capable of tightly pressing the tape which has been moved onto the pressing platform 152 as driven by the pressing cylinder 151, so as to limit the movement of the tape.

In one example, as illustrated in FIG. 2A, the compression platform 152 is further provided with a flattening plate 152, the flattening plate 152a is configured to press against the tape, so that the tape on the compression platform 152 can move along the compression platform 152 in a manner of attaching to the compression platform 152. The flattening plate 152a may be made of an elastic material, so that the tape can well move when pressed against the compression platform 152.

In one example, as illustrated in FIG. 2A, the labeling device further includes a product placement component 16.

The product placement component 16 includes a base 161 and at least two product placement platforms 162 connected therewith; every product placement platform 162 may be sequentially moved to a preset position y as driven by the base 161; and the product placement platform 162 allows the product D to be placed thereon. By arranging the at least two product placement platforms 162, the labeling device, after completing labeling one product to be labeled, can immediately label a next product to be labeled, which improves the working efficiency of the labeling device.

Figure 2D:
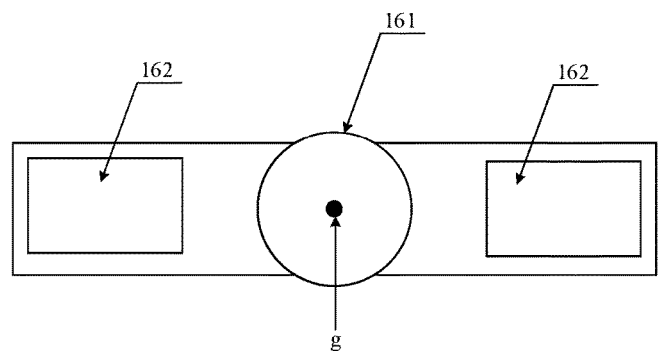
FIG. 2D is a schematic diagram illustrating a product placement component of the labeling device illustrated in FIG. 2A.

In one example, the at least two product placement platforms 162 are arranged in a circumferential array with a center of the base 161 as a circle center, and the base 161 is capable of rotating and driving the at least two product placement platforms 162 to circumferentially move with the center of the base 161 as the circle center. FIG. 2D is a top view of the product placement component 16 illustrated in FIG. 2A. As illustrated in FIG. 2D, the two product placement platforms 162 circumferentially move with a center g of the base 161 as the circle center. Of course, the number of the product placement platforms 162 is not limited to two as illustrated in FIG. 2A and FIG. 2D, but can be set by those skilled in the art according to actual needs.

In one example, as illustrated in FIG. 2A, the labeling device further includes a labeling inspection component 17. The labeling inspection component 17 is capable of acquiring an image of a labeled product located at an inspection position p, and determining whether the label on the labeled product (the product to be labeled having the labeling completed) satisfies a preset attachment precision or not according to the image as acquired. For example, the inspection position p may be a position where the product placement platform 162 places the labeled product. For example, every product placement platform 162, after moving to the preset position as driven by the base 161, can further move to the above-described inspection position p as driven by the base 161. For example, the labeling inspection component 17 may include a camera 171 to acquire the image of the labeled product located at the inspection position p.

In one example, the labeling inspection component 17 further includes a magnifying glass 172 with a light source, and the magnifying glass 172 with the light source may be disposed between the camera 171 and the inspection position p. The magnifying glass 172 with the light source may assist the camera 171 to acquire the image of the labeled product, and improve sharpness and brightness of the image.

Figure 2E:
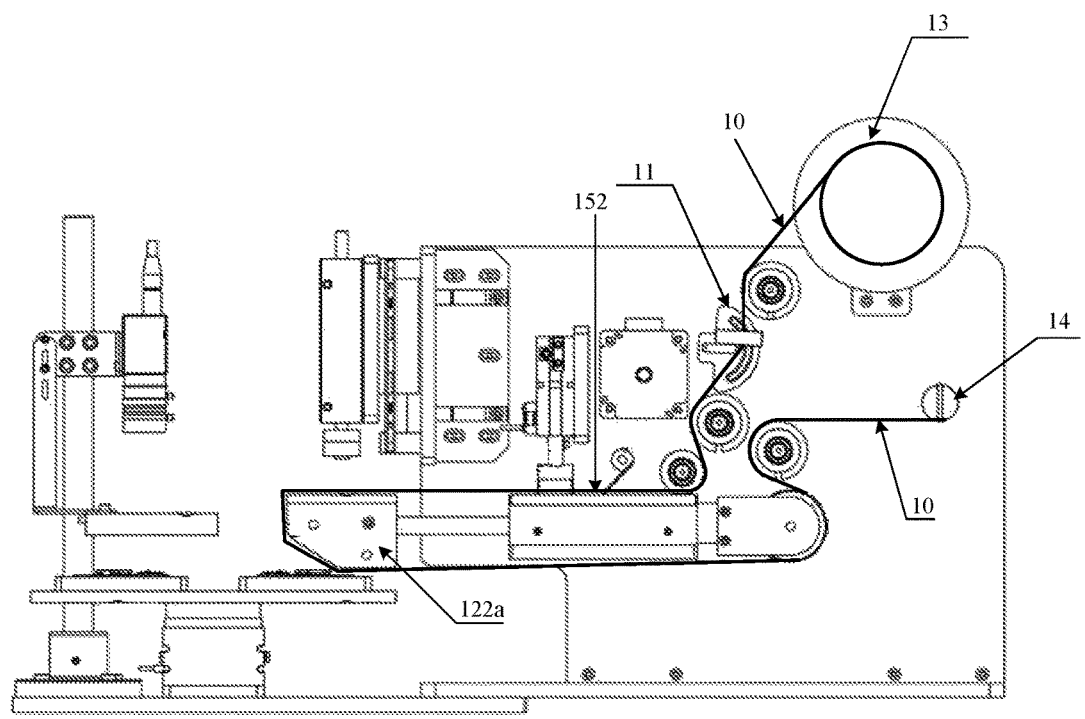
FIG. 2E is a schematic diagram illustrating an operation of the labeling device illustrated in FIG. 2A.

FIG. 2E is a structural schematic diagram illustrating the operation of the labeling device provided by the embodiment of the present disclosure. As illustrated in FIG. 2E, after exported from the feeding component 13, the tape 10 enters the scale control component 11, then is exported from the scale control component 11 and runs through the compression platform 152 and the stripping platform 122a, and finally enters the receiving component 14.

It should be additionally noted that, in the labeling device provided by the embodiment of the present disclosure, with the stripping platform capable of moving between the stripping position and the standby position as driven by the moving cylinder, it allows the stripping attaching rod to complete actions of grabbing the label and attaching the label only by a movement in the length direction thereof, which improves the precision of the label attaching process. The labeling device provided by the embodiment of the present disclosure has a higher degree of automation, can automatically complete labeling without manual operation, and can control the position of the label by the scale control component, so that the labeling device is capable of precisely attaching labels of different sizes onto the product to be labeled, which improves the applicability of the labeling device.

It should be additionally noted that, in the labeling device provided by the embodiment of the present disclosure, with the camera, the image of the labeled product in the inspection position is acquired, which achieves a technical effect of inspecting an attachment status of the label on the labeled product.

It should be additionally noted that, in the labeling device provided by the embodiment of the present disclosure, with the at least two product placement platforms, it is possible to continuously attach labels onto products to be labeled, which achieves a technical effect of improving the working efficiency of the labeling device.

It should be additionally noted that, in the labeling device provided by the embodiment of the present disclosure, with the compression component, it is possible to tightly press the tape when the attaching platform moves, so that the movement of the compression component will not affect the position of the tape, which improves the precision of label positioning.

In summary, in the labeling device provided by the embodiment of the present disclosure, every time when the label is attached onto the product to be labeled, the length of the tape as exported is controlled by the scale control component so as to increase the precision for the stripping component to grab the label and to attach the label onto the product to be labeled, which solves the problem of lower labeling precision in the prior art in which a labeling compression fixture is used for attaching the label onto the product, and achieves a technical effect of improving the labeling precision.

The above merely are specific embodiments of the present disclosure, but not intended to define the scope of the present disclosure. Any variations or replacements capable of being easily thought by those skilled in the art shall fall within the scope of the present disclosure. Thus, the scope of the disclosure shall be determined by the scope of the claims.

The present application claims priority of Chinese Patent Application No. 201510701954.X entitled "LABELING DEVICE" filed on Oct. 26, 2015, the disclosure of which is incorporated herein by reference in its entirety as part of the present application.

The invention claimed is:

1. A labeling device, comprising a scale control component and a stripping component; wherein, the scale control component is configured to acquire a tape, and to export the tape at a predetermined length;

the stripping component is configured to grab a target label on the tape exported from the scale control component and to attach the target label onto a product to be labeled which is located at a preset position, so as to obtain a labeled product, wherein the tape is provided with a plurality of equally spaced labels, and a length L of the tape exported from the scale control component satisfies $H+K \leq L < H+2K$, where K is a space between the labels, and H is a length of the label, and the scale control component comprises a fixing member, a moving member and a label sensor, and the labeling device further comprises a scale control module electrically connected with the scale control component, wherein the moving member is movably connected with the fixing member;

the moving member is configured to clamp the tape, and to move on the fixing member as driven by the tape;

the label sensor is configured to sense a spacing region between the labels on the tape;

the scale control module is configured to, upon the label sensor sensing the spacing region ahead of the target label on the tape, control the moving member to clamp the tape and to be moved from an initial position for a preset distance as driven by the tape and then stop, so as to limit a movement of the tape; and the scale control module is further configured to, upon the stripping component attaching the target label onto to the product to be labeled, control the moving member to return to the initial position, wherein the preset distance is equal to the length L of the tape exported from the scale control component; the spacing region is a region between adjacent labels on the tape; and the spacing region ahead of the target label is one of the spacing regions on both ends of the target label, which is more forward along a moving direction.

2. The labeling device according to claim 1, further comprising a feeding component and a receiving component, wherein,
   the feeding component is configured to initially store the tape;
   the receiving component is configured to pull out and receive the tape exported from the feeding component;
   wherein the scale control component, the stripping component, the feeding component and the receiving component are arranged such that: the tape exported from the feeding component as driven by the receiving component is received by the receiving component only upon running through the scale control component and through the stripping component.

3. The labeling device according to claim 2, wherein the feeding component is a wheel, and the receiving component is a motor-driven wheel.

4. The labeling device according to claim 1, wherein the stripping component comprises an attaching cylinder and a moving cylinder, and
   the labeling device further comprises a stripping control module electrically connected with the stripping component, wherein
   the attaching cylinder is provided with a stripping attaching rod, the stripping attaching rod is configured to move along a length direction of the stripping attaching rod, and is configured to strip the target label off the tape and attach the target label onto the product to be labeled;
   the moving cylinder is provided with a stripping platform, the stripping platform is configured to move between a stripping position and a standby position as driven by the moving cylinder; and
   the stripping control module is configured to, upon the stripping platform being in the stripping position and the target label having moved with the tape to the stripping platform, control the stripping attaching rod to grab the target label; and the stripping control module is further configured to, upon the stripping attaching rod grabbing the target label, control the stripping platform to move to the standby position and control the stripping attaching rod to stretch out, so as to attach the target label onto the product to be labeled.

5. The labeling device according to claim 4, further comprising a compression component, the compression component comprises a compression cylinder and a compression platform, and the compression component is configured to acquire the tape exported from the scale control component and guide the tape to the stripping component, wherein,
   the compression cylinder is provided with a compression rod, and the compression rod is configured to press the tape which has moved to the compression platform, as driven by the compression cylinder.

6. The labeling device according to claim 5, wherein,
   the compression platform is further provided with a flattening plate, the flattening plate is configured to press against the tape, so that the tape moves on the compression platform in a manner of attaching to the compression platform.

7. The labeling device according to claim 1, further comprising a product placement component, wherein,
   the product placement component comprises a base and at least two product placement platforms connected therewith, and
   every product placement platform is configured to allow a product to be labeled to be placed thereon, and is configured to move the product to be labeled to the preset position, as driven by the base, in sequence.

8. The labeling device according to claim 7, wherein,
   the at least two product placement platforms are arranged in a circumferential array with a center of the base as a circle center, and
   the base is capable of rotating and driving the at least two product placement platforms to circumferentially move with the center of the base as the circle center.

9. The labeling device according to claim 7, further comprising a labeling inspection component,
   the labeling inspection component is configured to acquire an image of the labeled product located at an inspection position, and configured to determine whether the label on the labeled product satisfies a preset attachment precision or not according to the image;
   wherein every product placement platform, upon moving to the preset position as driven by the base, is capable of further moving to the inspection position as driven by the base.

10. The labeling device according to claim 9, wherein the labeling inspection component comprises a camera configured to acquire the image of the labeled product located at the inspection position.

11. The labeling device according to claim 10, wherein the labeling inspection component further comprises a magnifying glass with a light source, and
    the magnifying glass with the light source is disposed between the camera and the inspection position.

* * * * *